(12) United States Patent
Wu et al.

(10) Patent No.: US 11,166,592 B2
(45) Date of Patent: Nov. 9, 2021

(54) FOOD PROCESSOR

(71) Applicant: WHIRLPOOL CORPORATION, Benton Harbor, MI (US)

(72) Inventors: Wenkai Wu, Aurora, IL (US); John McConnell, St. Joseph, MI (US); David Gushwa, Mishawaka, IN (US); Andria R. Bauman, Cleveland, TN (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 422 days.

(21) Appl. No.: 16/102,846

(22) Filed: Aug. 14, 2018

(65) Prior Publication Data

US 2019/0090694 A1   Mar. 28, 2019

Related U.S. Application Data

(60) Provisional application No. 62/562,550, filed on Sep. 25, 2017.

(51) Int. Cl.
*A47J 43/046* (2006.01)
*A47J 43/08* (2006.01)
*A47J 43/07* (2006.01)
*A47J 43/25* (2006.01)

(52) U.S. Cl.
CPC ......... *A47J 43/046* (2013.01); *A47J 43/0716* (2013.01); *A47J 43/0722* (2013.01); *A47J 43/085* (2013.01); *A47J 43/255* (2013.01)

(58) Field of Classification Search
CPC ..... A47J 43/046; A47J 43/0716; A47J 43/085
See application file for complete search history.

(56) References Cited

U.S. PATENT DOCUMENTS

| | | |
|---|---|---|
| 2,146,710 A | 2/1939 | Bloomfield |
| 2,284,155 A | 5/1942 | Landgraf |
| 2,510,934 A | 6/1950 | Schildknecht |
| D176,257 S | 12/1955 | Hill et al. |
| D181,541 S | 11/1957 | Madl et al. |
| D187,684 S | 4/1960 | Hauser et al. |
| 4,108,054 A | 8/1978 | Klocker et al. |
| 4,213,569 A | 7/1980 | Amiot |
| 4,216,917 A | 8/1980 | Clare et al. |
| 4,283,979 A * | 8/1981 | Rakocy .................. B26D 3/225 241/92 |
| 4,371,118 A | 2/1983 | Sontheimer et al. |
| 4,487,509 A | 12/1984 | Boyce |
| 4,512,448 A | 4/1985 | Estang |

(Continued)

FOREIGN PATENT DOCUMENTS

| | | |
|---|---|---|
| EP | 0893087 A1 | 1/1999 |
| EP | 3146875 A1 | 3/2017 |

(Continued)

*Primary Examiner* — Elizabeth Insler
(74) *Attorney, Agent, or Firm* — Price Heneveld LLP

(57) ABSTRACT

A food processor for processing food stuffs having a base assembly, a jar assembly, and a blade assembly that can be rotated from a use position to a stored position is disclosed. The food processor includes a lid that is connected to the jar assembly by a hinge and closed by use of a latch. The jar assembly is connected to the base assembly by the use of push pins on the base assembly which engage corresponding holes on the jar assembly.

10 Claims, 9 Drawing Sheets

(56) References Cited

U.S. PATENT DOCUMENTS

| | | |
|---|---|---|
| 4,512,522 A | 4/1985 | Williams |
| D287,327 S | 12/1986 | Cavalli |
| 4,629,131 A | 12/1986 | Podell |
| 4,674,690 A | 6/1987 | Ponikwia et al. |
| 4,714,203 A | 12/1987 | Williams |
| D295,012 S | 4/1988 | Gelber |
| 4,883,144 A | 11/1989 | Haushalter et al. |
| D310,153 S | 8/1990 | Kaiser |
| 5,071,077 A | 12/1991 | Arroubi et al. |
| 5,104,050 A | 4/1992 | Herbert |
| D347,144 S | 5/1994 | Brady |
| 5,486,665 A | 1/1996 | Le Rouzic |
| 5,533,797 A | 7/1996 | Gelber |
| D390,416 S | 2/1998 | Hippen et al. |
| 5,852,968 A | 12/1998 | Sundquist |
| 5,957,577 A | 9/1999 | Dickson et al. |
| 6,019,238 A | 2/2000 | Kindig et al. |
| D424,865 S | 5/2000 | Crescenzi et al. |
| D427,016 S | 6/2000 | Kindig et al. |
| D432,864 S | 10/2000 | Kindig et al. |
| D444,995 S | 7/2001 | Thackray |
| 6,254,019 B1 | 7/2001 | Galbreath |
| 6,418,837 B1 | 7/2002 | Obersteiner |
| D466,761 S | 12/2002 | Baerenrodt et al. |
| 6,505,545 B2 * | 1/2003 | Kennedy ............... A47J 27/04 366/145 |
| 6,517,908 B1 | 2/2003 | Thom |
| 6,632,013 B2 | 10/2003 | Wulf et al. |
| D484,357 S | 12/2003 | Seum et al. |
| D488,344 S | 4/2004 | Seum et al. |
| D488,957 S | 4/2004 | Holderfield et al. |
| 6,786,141 B2 | 9/2004 | Tompa et al. |
| D502,047 S | 2/2005 | Ledingham et al. |
| D502,842 S | 3/2005 | Hallar |
| 6,971,597 B2 | 12/2005 | Starr |
| 7,018,091 B2 | 3/2006 | Arroubi et al. |
| 7,063,009 B2 | 6/2006 | Lin |
| D526,531 S | 8/2006 | Drees et al. |
| D528,363 S | 9/2006 | Ulanski et al. |
| D528,364 S | 9/2006 | Kolar et al. |
| D533,395 S | 12/2006 | Drees et al. |
| 7,159,808 B2 | 1/2007 | Starr |
| D547,601 S | 7/2007 | Ting et al. |
| D552,412 S | 10/2007 | Steiner |
| D557,976 S | 12/2007 | Olson et al. |
| 7,318,666 B1 | 1/2008 | Lin |
| D577,257 S | 9/2008 | Kuan |
| D577,537 S | 9/2008 | Lee |
| D578,341 S | 10/2008 | Picozza et al. |
| D587,064 S | 2/2009 | Mark |
| D587,526 S | 3/2009 | Barnard et al. |
| D588,406 S | 3/2009 | Ulanski |
| 7,520,663 B1 | 4/2009 | Kolar et al. |
| D594,697 S | 6/2009 | Lavy |
| D595,087 S | 6/2009 | Metaxatos et al. |
| 7,562,838 B2 | 7/2009 | Leung et al. |
| D605,462 S | 12/2009 | Picozza et al. |
| D616,244 S | 5/2010 | Thai et al. |
| D617,136 S | 6/2010 | Bock et al. |
| D621,656 S | 8/2010 | Ulanski et al. |
| 7,775,705 B2 | 8/2010 | Kozlowski et al. |
| D631,282 S | 1/2011 | Ferraby |
| D637,862 S | 5/2011 | Fouquet |
| D637,870 S | 5/2011 | Bock |
| 7,959,347 B2 | 6/2011 | Pryor, Jr. et al. |
| 7,993,054 B2 | 6/2011 | Wulf et al. |
| D642,858 S | 8/2011 | Lazzer |
| D644,480 S | 9/2011 | Czach et al. |
| 8,042,990 B2 | 10/2011 | Pryor, Jr. et al. |
| 8,051,769 B2 | 11/2011 | Conti et al. |
| 8,087,603 B2 | 1/2012 | Kolar et al. |
| 8,122,821 B2 | 2/2012 | Sands |
| D662,359 S | 6/2012 | Boozer et al. |
| D667,683 S | 9/2012 | Czach et al. |
| 8,287,180 B2 | 10/2012 | Kolar et al. |
| D670,531 S | 11/2012 | Carlson |
| D683,180 S | 5/2013 | Carlson |
| 8,439,285 B2 | 5/2013 | Beber et al. |
| 8,529,120 B2 | 9/2013 | Ulanski |
| D694,572 S | 12/2013 | Kobos et al. |
| D694,573 S | 12/2013 | Norland et al. |
| D694,574 S | 12/2013 | Norland et al. |
| D694,582 S | 12/2013 | Norland |
| D694,583 S | 12/2013 | Norland |
| D702,993 S | 4/2014 | Lownds |
| 8,733,239 B2 * | 5/2014 | Allen ................... A47J 43/046 99/537 |
| 8,752,481 B2 | 6/2014 | Williams et al. |
| D711,682 S | 8/2014 | Norland et al. |
| 8,814,011 B2 | 8/2014 | Ulanski |
| RE45,308 E | 12/2014 | Kolar et al. |
| 8,899,504 B2 | 12/2014 | Gushwa |
| 8,985,488 B2 | 3/2015 | Hidalgo Garcia et al. |
| D731,234 S | 6/2015 | Weaden et al. |
| D731,236 S | 6/2015 | Yin |
| 9,049,967 B1 | 6/2015 | Golino et al. |
| RE45,655 E | 8/2015 | Kolar et al. |
| D739,679 S | 9/2015 | Benoit et al. |
| 9,149,065 B2 | 10/2015 | Hoare et al. |
| 9,198,540 B2 | 12/2015 | Carlson |
| D747,135 S | 1/2016 | Ha |
| D755,004 S | 5/2016 | Bock et al. |
| 9,380,913 B2 | 7/2016 | Golino |
| 9,474,417 B1 | 10/2016 | Pryor, Jr. et al. |
| D770,226 S | 11/2016 | McConnell et al. |
| D772,008 S | 11/2016 | McConnell et al. |
| D772,009 S | 11/2016 | McConnell et al. |
| D782,247 S | 3/2017 | Kim et al. |
| D783,356 S | 4/2017 | Kim et al. |
| 9,635,981 B2 | 5/2017 | Barnard et al. |
| D798,109 S | 9/2017 | Ulanski et al. |
| 9,750,372 B2 | 9/2017 | Foxlee et al. |
| 9,775,467 B2 | 10/2017 | Sapire |
| 9,855,535 B2 | 1/2018 | Arnett et al. |
| 2004/0146621 A1 | 7/2004 | Kennedy |
| 2005/0152215 A1 | 7/2005 | Stuart et al. |
| 2008/0298172 A1 | 12/2008 | Krasznai |
| 2009/0080285 A1 | 3/2009 | Brotz |
| 2010/0308142 A1 | 12/2010 | Krasznai et al. |
| 2011/0188340 A1 | 8/2011 | Kolar et al. |
| 2011/0248108 A1 | 10/2011 | Carriere |
| 2014/0217211 A1 | 8/2014 | Sanford |
| 2014/0299690 A1 | 10/2014 | Zakowski |
| 2015/0098299 A1 | 4/2015 | Sapire |
| 2016/0035335 A1 | 2/2016 | Kolar et al. |
| 2016/0256839 A1 | 9/2016 | Dickson, Jr. et al. |
| 2016/0331182 A1 | 11/2016 | Golino |
| 2017/0086623 A1 | 3/2017 | Lee |
| 2018/0116466 A1 | 5/2018 | Pilch et al. |

FOREIGN PATENT DOCUMENTS

| | | |
|---|---|---|
| FR | 2447703 | 8/1980 |
| WO | 2013120145 A1 | 8/2013 |

* cited by examiner

FOOD PROCESSOR

CROSS REFERENCE TO RELATED APPLICATION

The present application claim the priority benefit under 35 U.S.C. § 119, basing said claim of priority on related provisional patent U.S. Application Ser. No. 62/562,550 filed Sep. 25, 2017, which is incorporated hereby by reference.

BACKGROUND

Food processors generally include a drive motor that rotates a cutting tool within a removable bowl/jar. Food to be processed is fed to the cutting tool to be chopped, ground, or sliced. The processed food is then maintained within the processing chamber of the removable bowl/jar and removed once the food processing is completed.

Food processors typically include lids that are closed and/or sealed to create the food processing chamber within the bowl/jar. These lids are typically twisted onto the bowl/jar. This can be inconvenient as it takes additional time to untwist the lid to access the food processing chamber. In addition, the bowl/jar is also typically twisted onto the base of the food processor. Again, this takes additional time to untwist the bowl/jar from the base in order to remove the bowl/jar from the base. In addition, the bowl/jar can potentially become unsecure when the food processor is in use. In addition, the blade assembly typically needs to be removed from the food processor when the food processor is not in use. For safety reasons, leaving the blade assembly in a use position can be dangerous.

It would be desirable to have a food processor that would enable easy access to the food processing chamber. In addition, it would be desirable to have a food processor that easily attaches to the base in a secure manner. Lastly, it would be desirable to have a food processor with a blade assembly that can be rotated into a non-use/stored position so that the blade assembly does not need to be removed from the food processor during storage.

SUMMARY

One aspect of the present invention is a food processor with a blade assembly. The food processor includes a base and a jar that is removably secured to the base. The jar has a lid that creates a food processing chamber in the jar when the lid is in the closed position. A rotatable shaft is powered by the base in order to rotate the blade assembly. The blade assembly includes a disk hub configured to be received on the rotatable shaft. The blade assembly can be moved into a first blade assembly engagement position, wherein the blade assembly can be used to process food within the food processing chamber. The blade assembly can also be moved into a second blade assembly engagement position, wherein the blade assembly is in the position where it cannot be used to process food within the food processing chamber.

In another aspect of the present invention, the lid of the food processor can be connected to the jar by a hinge and closed by use of a latch. In addition, the jar can have at least one opening to connect with a corresponding push pin coupled to the base.

The food processor can include an adaptor that is configured to be received over the rotatable shaft that is powered by the base to engage the disk hub portion of the blade assembly.

These and other features, advantages, and objects of the present device will be further understood and appreciated by those skilled in the art upon studying the following specification, claims, and appended drawings.

DETAILED DESCRIPTION OF EMBODIMENTS

Figure 1:
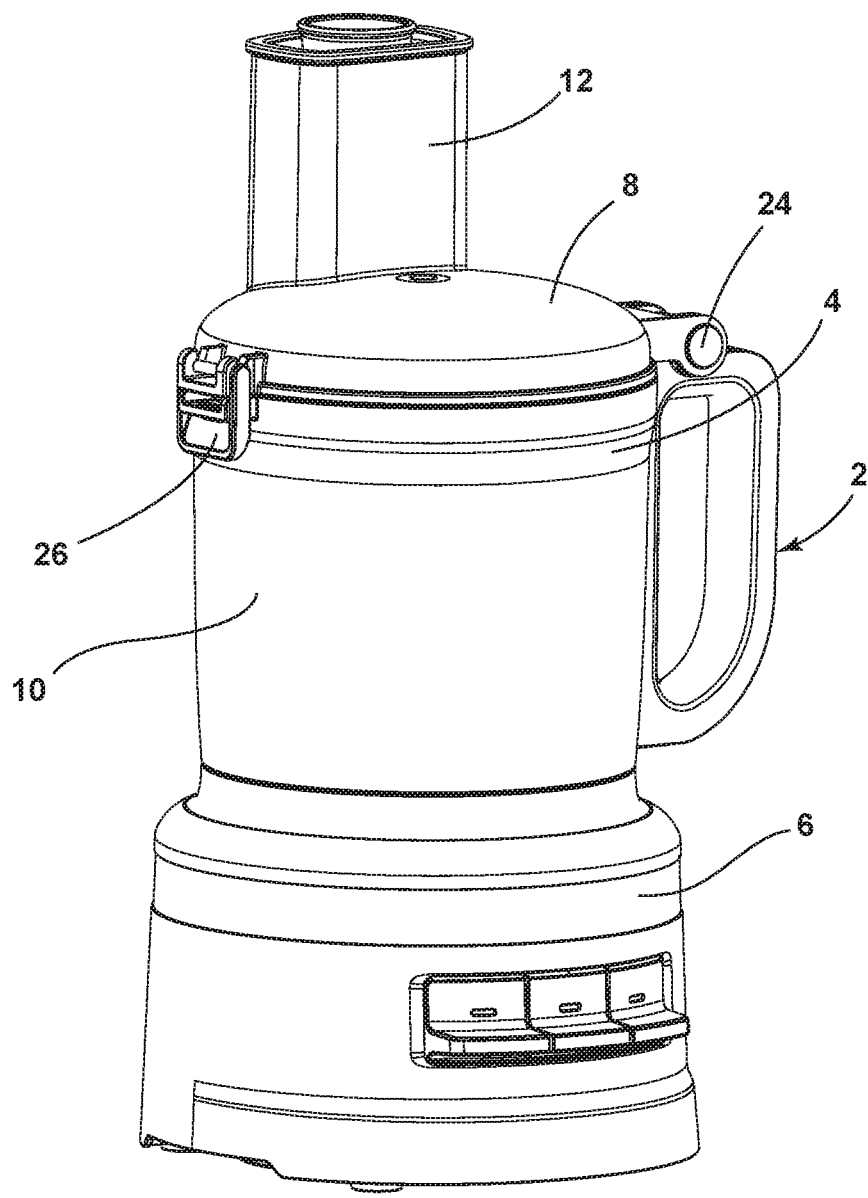
FIG. 1 is a front perspective view of a food processor according to an embodiment of the present concept.
Figure 2:
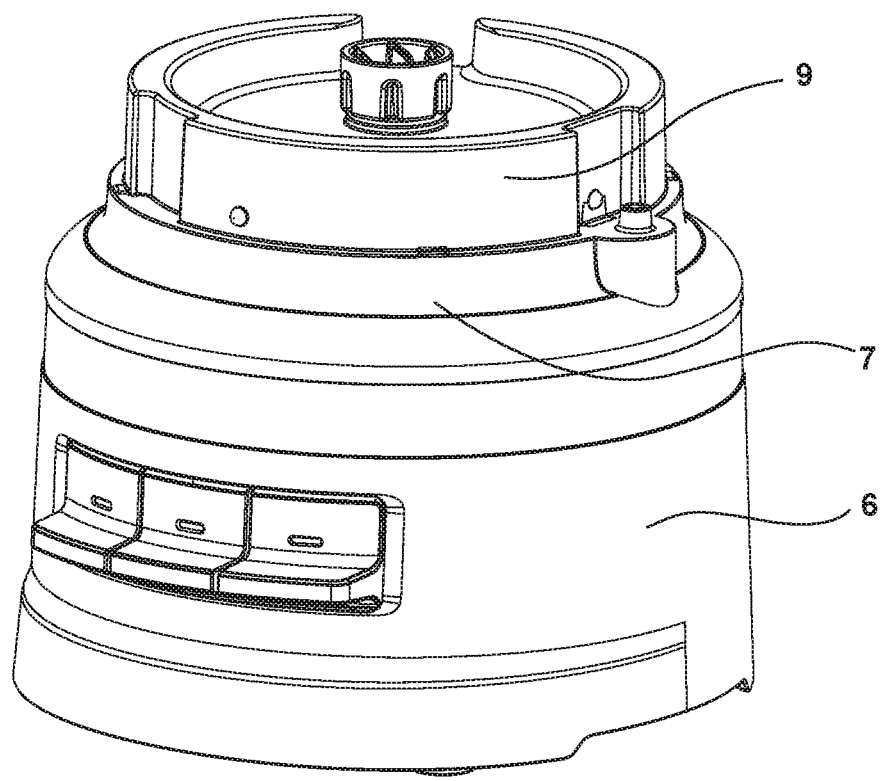
FIG. 2 is a front perspective view of the base assembly of the food processor shown in FIG. 1.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
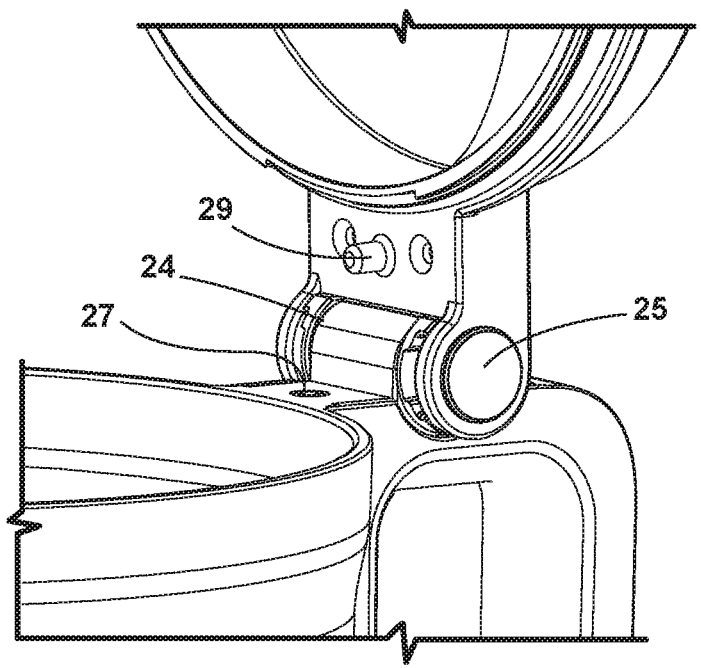
FIG. 4 is a partial side perspective view of the hinge used to connect the lid to the jar of the food processor shown in FIG. 1.
Figure 5:
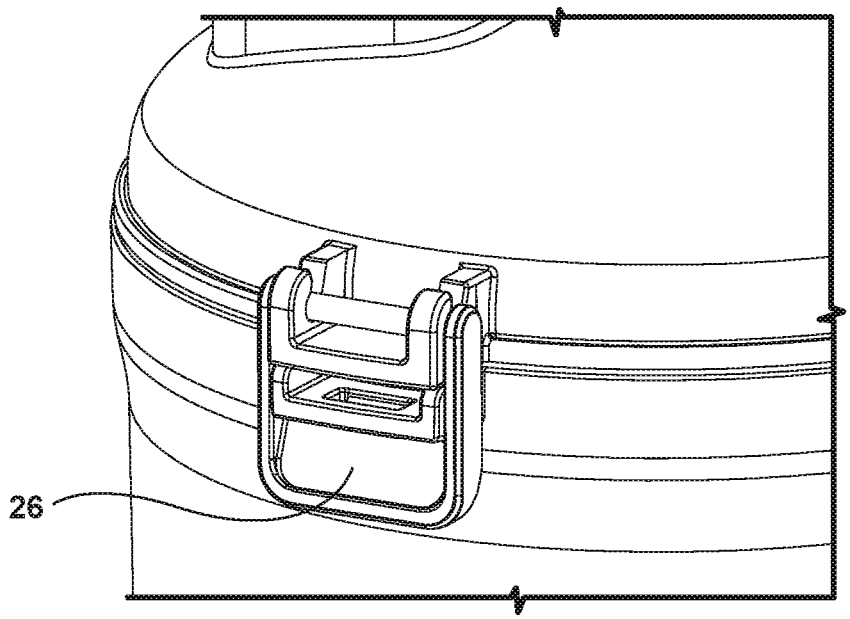
FIG. 5 is a partial side perspective view of the latch on the lid of the food processor shown in FIG. 1.

Referring to the embodiment illustrated in FIG. 1, reference numeral 2 generally designates a food processor in accordance with one of the embodiments of the present invention. The food processor 2 includes a jar assembly 4 and a base assembly 6. The jar assembly 4 includes a handle 22 for handling the jar assembly 4. The jar assembly 4 includes a lid 8 that is connected to the jar assembly 4 via a hinge 24 to create a food processing chamber 10 within the jar assembly 4 when the lid 8 is closed. The hinge 24 can include a hinge cap 25 to help keep the hinge 24 connected to the lid 8 and the jar assembly 4. The lid 8 can include a post 29 that is received in a seal cap 27 to help seal the lid 8 near the hinge 24, as illustrated in FIG. 4. In the illustrated embodiment, the latch 26 is disposed generally opposite the hinge 24. However, it should be understood that more than one latch 26 can be used and the latch(es) 26 can be located anywhere along the lid 8 to connect to the jar assembly 4.

Figure 3:
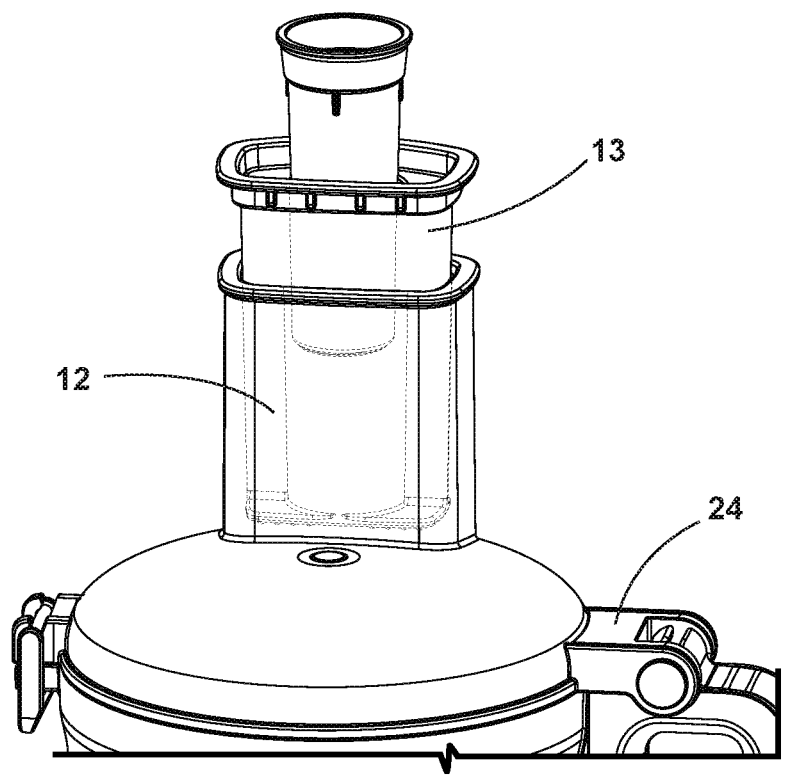
FIG. 3 is a partial front perspective view of the lid and feed tube assembly of the food processor shown in FIG. 1.
Figure 6:
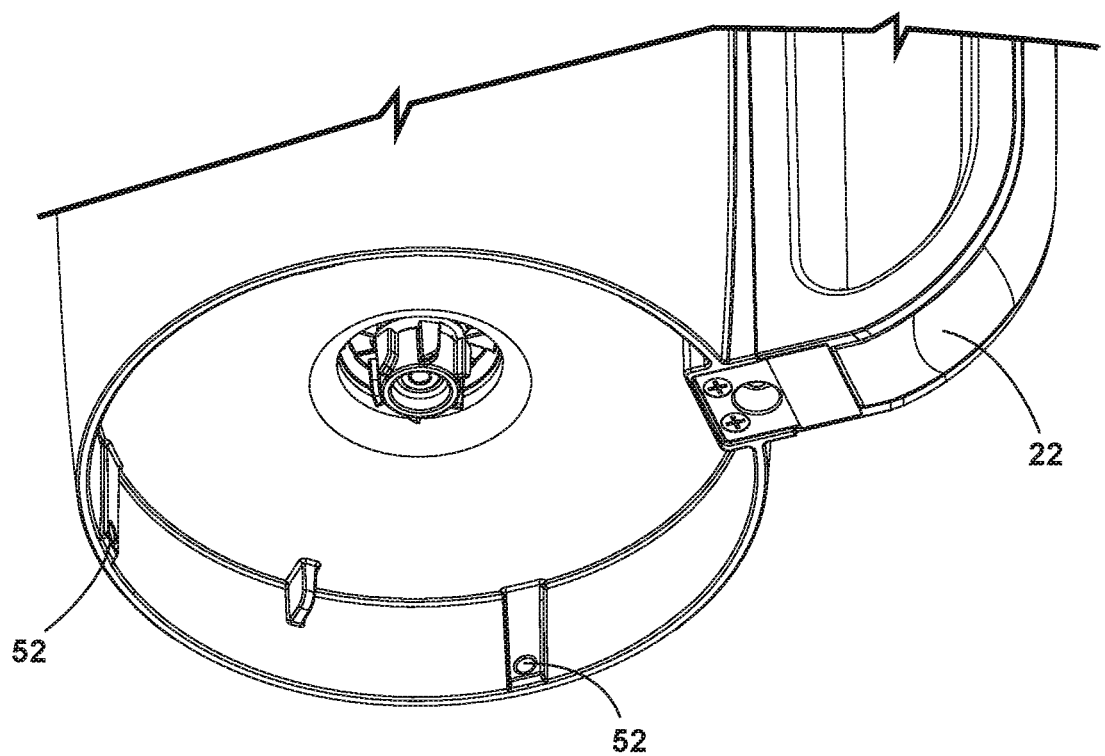
FIG. 6 is a partial bottom perspective view of the jar assembly of the food processor shown in FIG. 1.
Figure 7:
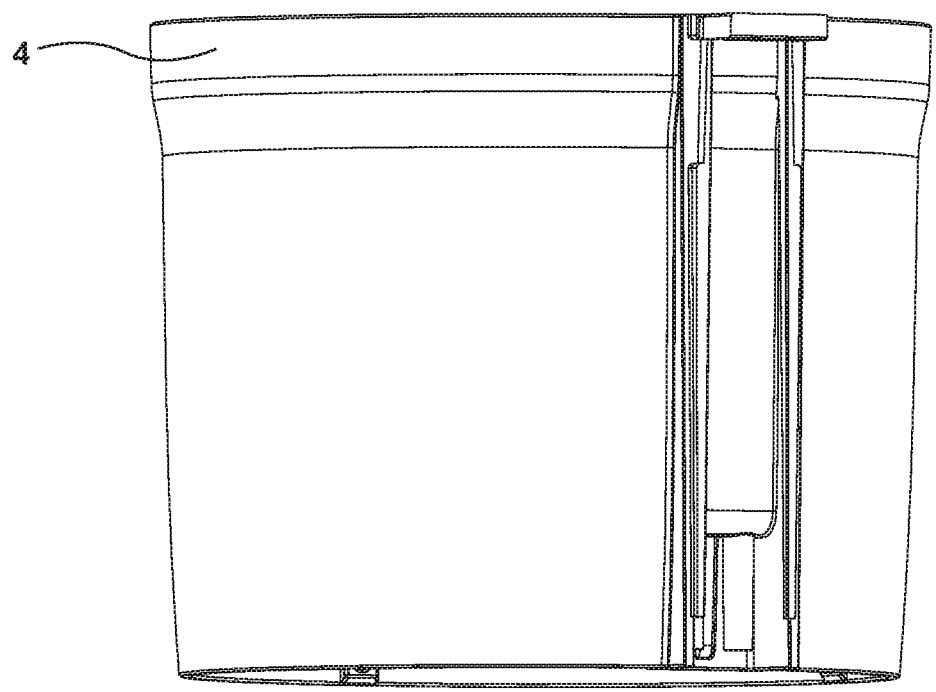
FIG. 7 is a side perspective view of the jar assembly without the lid.
Figure 8:
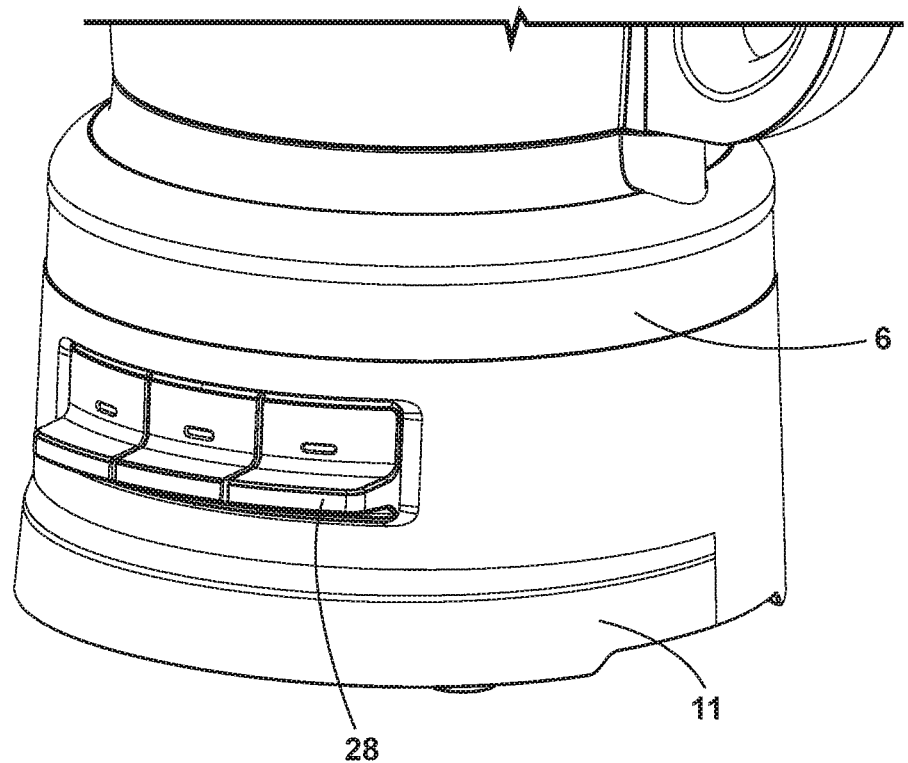
FIG. 8 is a partial side perspective view of the base of the food processor.
Figure 9:
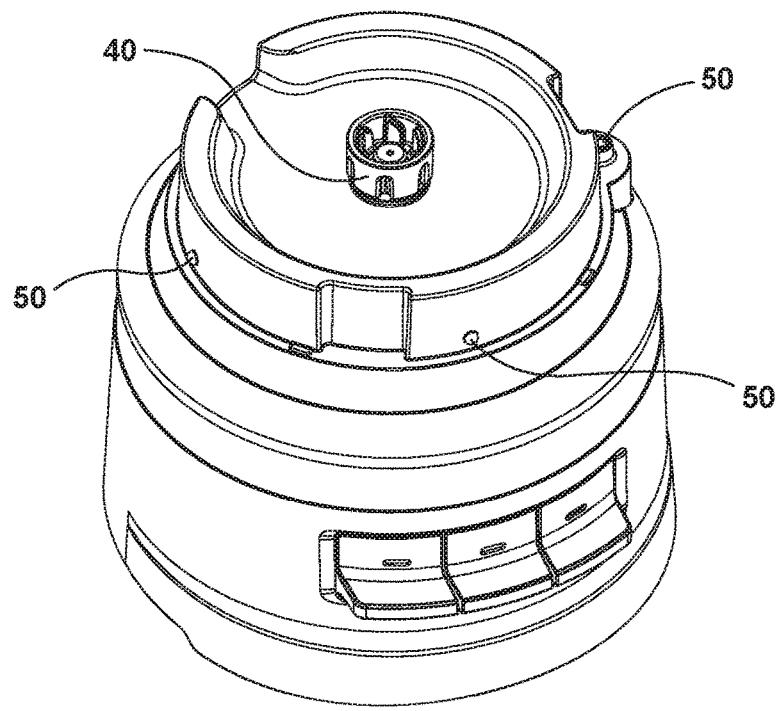
FIG. 9 is a top perspective view of the base of the food processor.

The food processor 2 includes a feed tube 12 wherein food to be processed can be inserted into the jar assembly 4. The feed tube 12 can include an pusher 13 to assist in the movement of the food to the food processing chamber 10, as illustrated in FIG. 3. As illustrated in FIG. 6, the bottom of the jar assembly 4 has a number of openings 52, which will connect to the push pins 50, as illustrated in FIG. 9.

The base assembly 6 includes a top portion 9 configured to engage the jar assembly 4 and a bottom portion 11 configured set on a surface, such as a countertop. The base assembly 6 includes controls 28 for actuating the drive shaft 16 for food processing. In addition, the controls 28 can have light emitting diode (LED) lights or can be used to activate LED lights in the food processor 2. The base assembly 6 also includes a coupler 40, as illustrated in FIG. 9, which couples with a drive shaft 16. The drive shaft 16 is powered by an electric motor within the base assembly 6. The drive shaft 16, connected by coupler 40 to the motor, is used to rotate the blade assembly 14. As shown in the illustrated embodiment, one or more intermediate pieces (such as adaptor 32) can be coupled to the drive shaft 16 to assist with the engagement of the blade assembly 14.

Figures 10A, 10B:
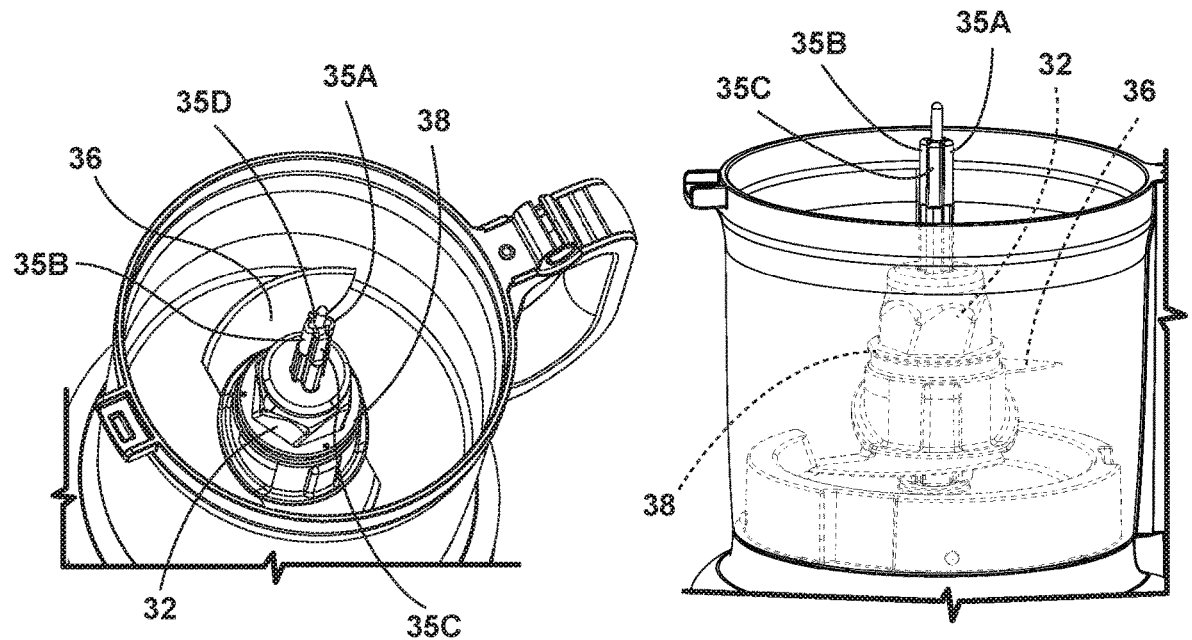
FIG. 10A is a partial top perspective view of the food processing jar with the blade assembly.
FIG. 10B is a partial side perspective view of the food processing jar with the adaptor placed over the rotatable shaft.
Figure 11:
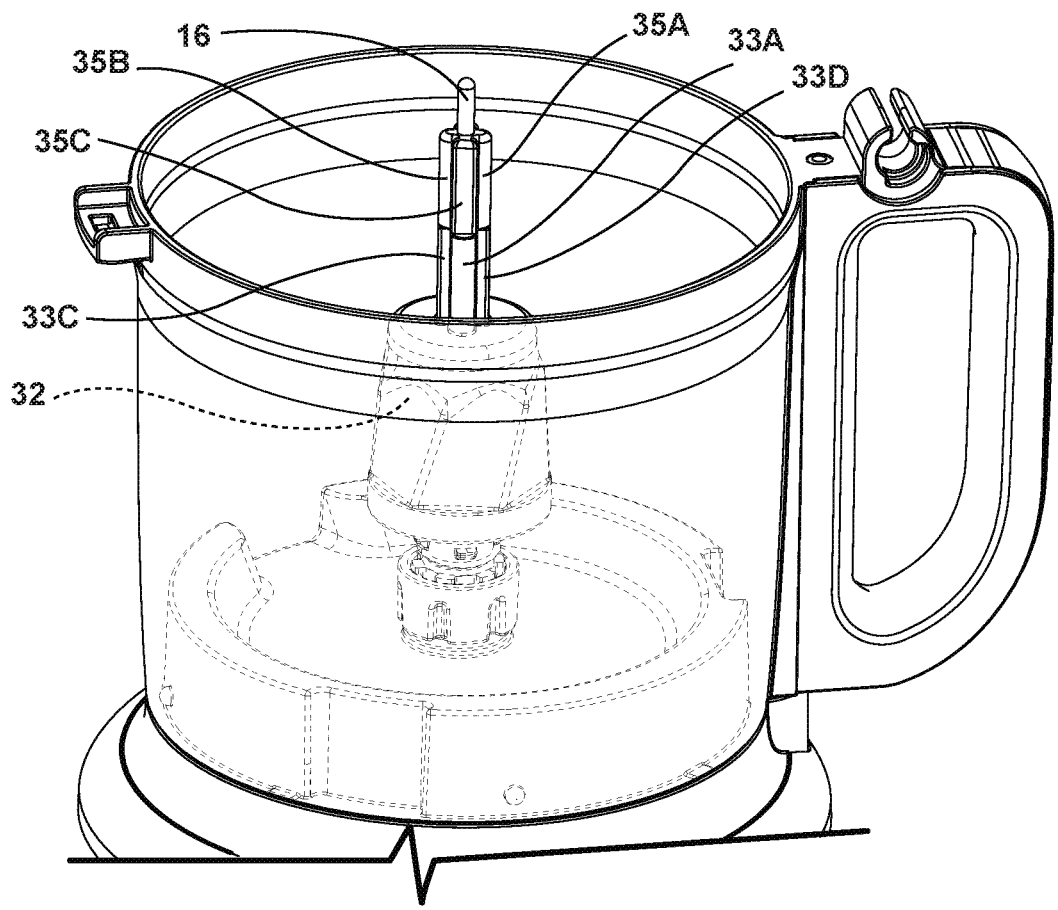
FIG. 11 is a partial front perspective view of the food processing jar showing the rotatable shaft without the adaptor.
Figure 12:
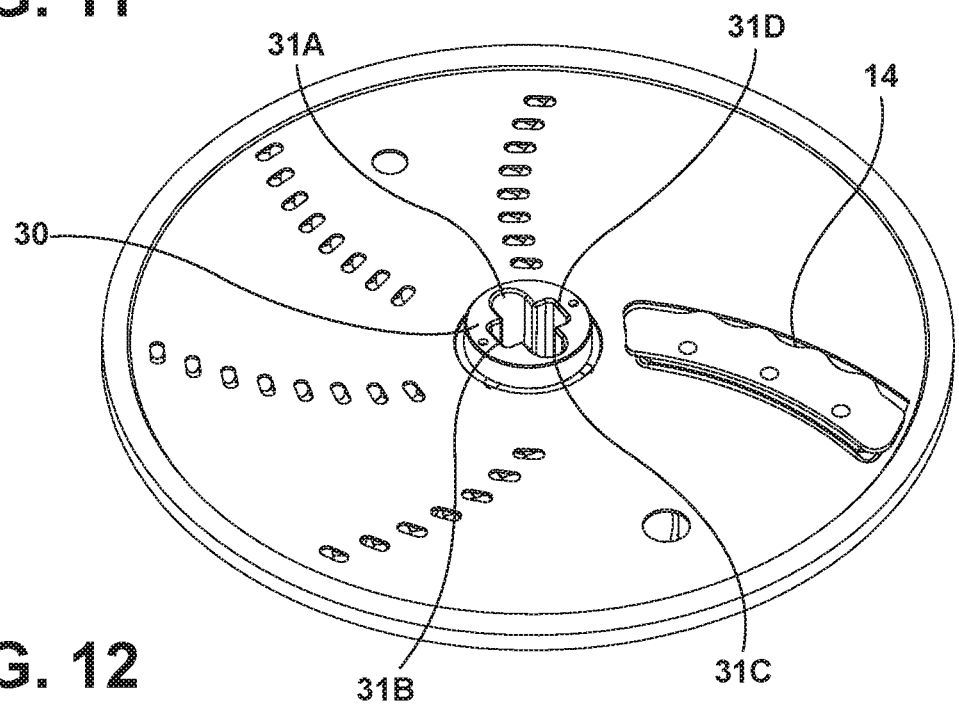
FIG. 12 is a top perspective view of the blade assembly.

As illustrated in FIG. 12, the blade assembly 14 includes a disk hub 30. The disk hub 30 is configured to be received on the adaptor 32, shown in FIG. 11, which is placed over the drive shaft 16, which is shown in FIG. 11. An alternative blade assembly 36 with an alternative disk hub 38 is illustrated in FIG. 10A.

In the illustrated embodiment, the portion of the adaptor 32 over the lower portion of the drive shaft 16 includes oppositely disposed curved or rounded surfaces 33A, 33B and oppositely disposed flat surfaces 33C, 33D. These surfaces 33A, 33B, 33C, and 33D generally match the contour of the surfaces 31A, 31B, 31C, and 31D on an inner opening of the hub 30 of the blade assembly 14. Similarly, the upper portion of the drive shaft 16 (or an upper portion of the adaptor 32, if used) includes surfaces 35A, 35B, 35C, and 35D that generally match the contour of the surfaces 31A, 31B, 31C, and 31D of the inner opening of the hub 30 of the blade assembly 14. In the illustrated embodiment, the inner opening of the hub 30 includes four surfaces. However, any number of surfaces can be used and any shape of the surface can be used provided that the hub 30 can be held on either the lower portion of the drive shaft 16 (and/or the portion of the adaptor 32, if used) or the upper portion of the drive shaft 16 (and/or on the portion of the adaptor 32, if used).

Figure 13:
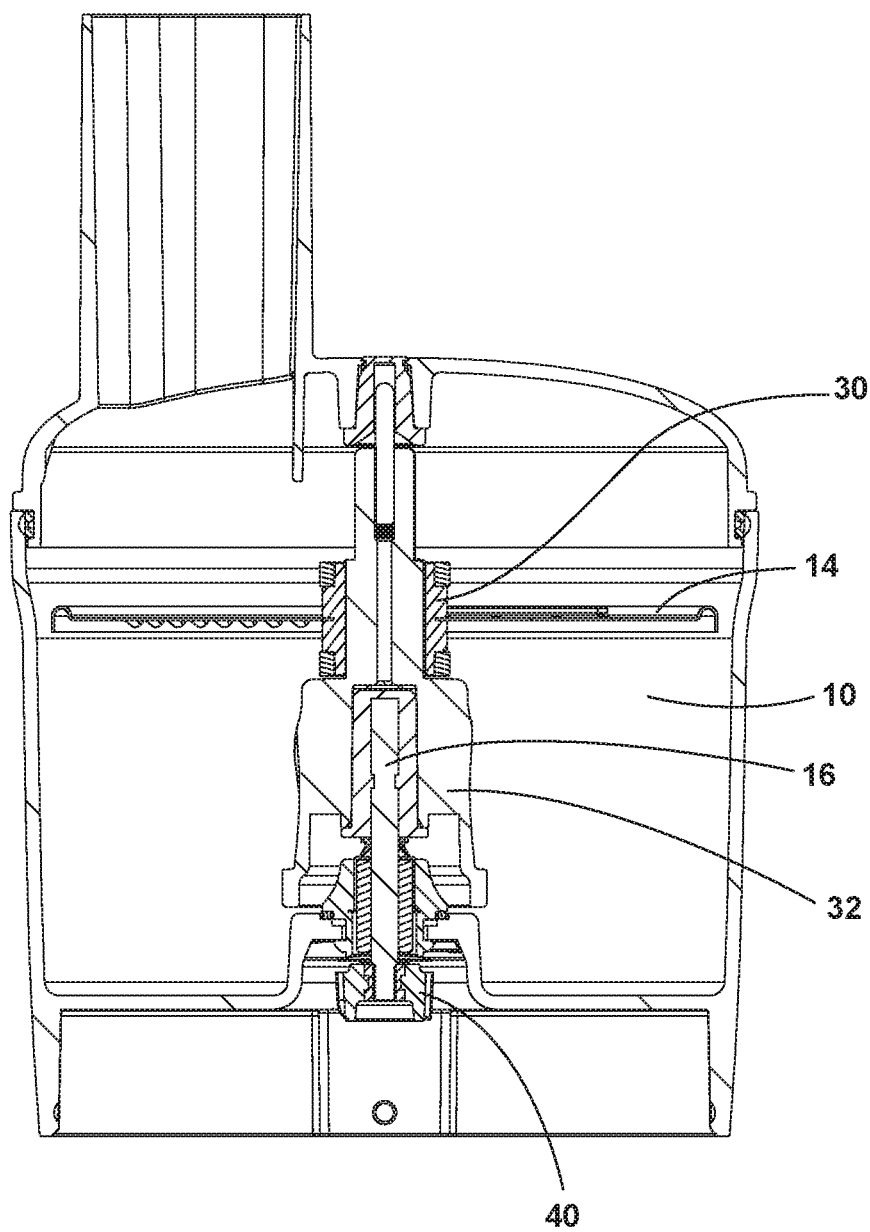
FIG. 13 is a cross-sectional side view of the jar, adaptor, and blade assembly of the food processor with the blade assembly in a use position.
Figure 14:
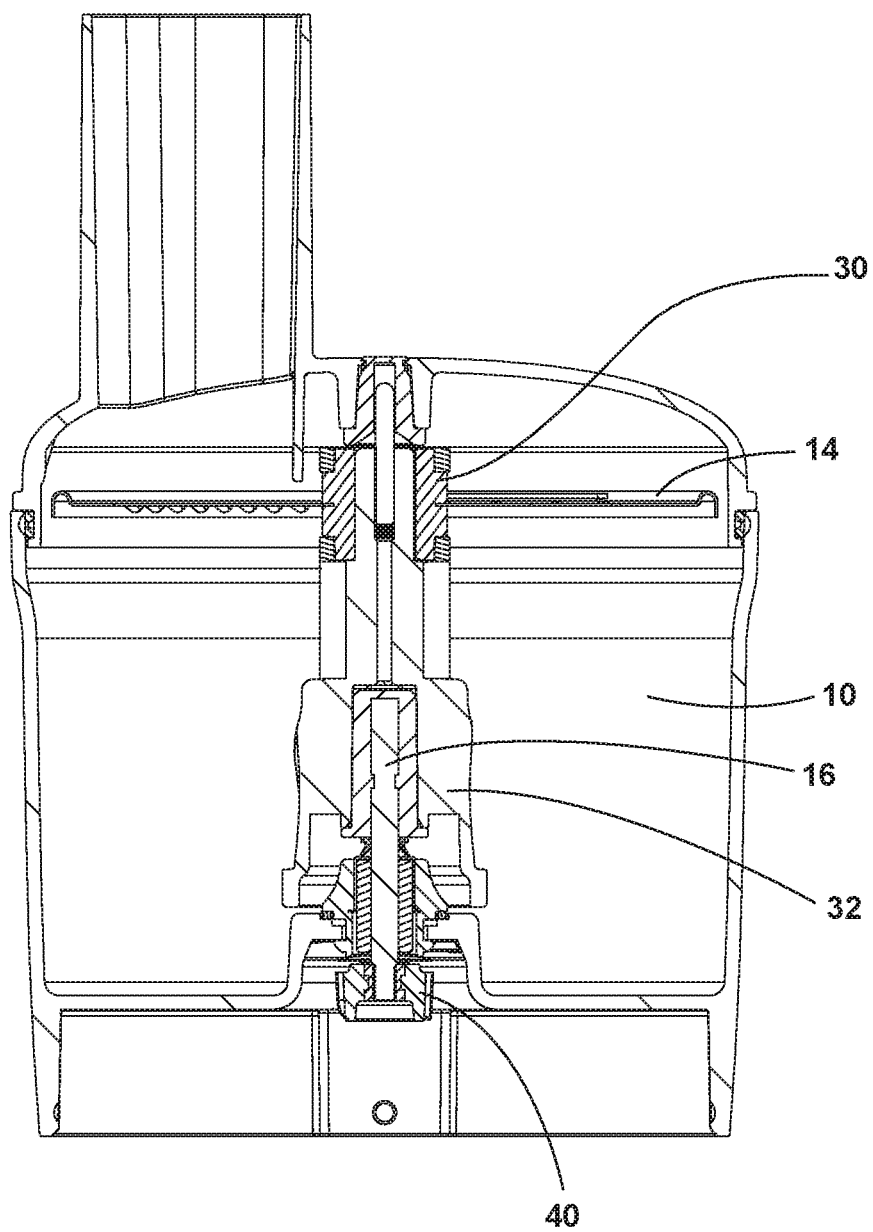
FIG. 14 is a cross-sectional side view of the jar, adaptor, and blade assembly of the food processor with the blade assembly in a non-use or stored position.

As illustrated in FIG. 13, the blade assembly 14 can be rotated into a first blade assembly engagement position for use in food processing. This is when the disk hub 30 engages the lower portion of the drive shaft 16 or the portion of the adaptor 32 over the lower portion of the drive shaft 16 if an adaptor 32 is used. As illustrated in FIG. 14, the blade assembly 14 can be moved into a second blade assembly engagement position where the blade assembly 14 does not process food within the food processing chamber 10. In this position, the blade assembly 14 has been rotated on the adaptor 32 to the second blade assembly engagement position. As shown in FIG. 11, the curved or rounded surfaces 35A, 35B of the upper portion are not positioned above the curved or rounded surfaces 33A, 33B of the lower portion and the flat surfaces 35C, 35D of the upper portion are not positioned above the flat surfaces 33C, 33D of the lower portion when the blade assembly 14 has been rotated to the second blade assembly engagement position. While the illustrated embodiment shows two different blade assembly engagement positions (use and storage positions), multiple blade assembly engagement positions are possible, depending upon the configuration of the adaptor 32 and the connection between the adaptor 32 and the disk hub 30.

The space saving aspects of the present invention are especially useful in smaller-sized food processors, such as a seven-cup food processor. However, the aspects of the present invention can be used in any size food processor.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A blade assembly for a food processor, comprising:
   a motor;
   a food processor base;
   a drive shaft surface with a lower section that rotates when the motor of the food processor rotates and an upper section that does not rotate when the motor in the food processor rotates;
   a disk hub with an inner through opening from the top of the disk hub to the bottom of the disk hub configured to be received on said drive shaft surface, with a portion of the drive shaft surface extending through said inner through opening wherein said inner through opening of said disk hub can be moved into a first blade assembly engagement position around a portion of the lower section of the drive shaft surface wherein the disk hub is rotated by said drive shaft surface and wherein when said inner through opening of said disk hub is moved into a second blade assembly engagement position around a portion of the upper section of the drive shaft surface wherein the disk hub is not rotated when the motor rotates; and
   a lid with a top surface that is positioned above said disk hub when said disk hub is in said first blade assembly engagement position and when said disk hub is in said second blade assembly engagement position.

2. The blade assembly for a food processor of claim 1, wherein the drive shaft surface includes an exterior surface of an adaptor that surrounds a portion of the drive shaft surface said exterior surface of the adaptor engaging said inner through opening of said disk hub of said blade assembly.

3. The blade assembly for a food processor of claim 1, wherein said inner through opening of said disk hub has four quadrants that contact said drive shaft surface, with two pairs of oppositely disposed surfaces extending from the bottom surface to the top surface of said inner through opening.

4. The blade assembly for a food processor of claim 3, wherein one pair of said oppositely disposed surfaces includes curved edges.

5. The blade assembly for a food processor of claim 4, wherein the other pair of said oppositely disposed surfaces includes flat edges.

6. The blade assembly for a food processor of claim 3, wherein said inner through opening on said disk hub engages the lower section of said drive shaft surface when said blade assembly is in said first blade assembly engagement position.

7. The blade assembly for a food processor of claim 6, wherein said inner through opening on said disk hub engages the upper section of said drive shaft surface when said blade assembly is in said second blade assembly engagement position.

8. The blade assembly for a food processor of claim 7, wherein said lower section of said drive shaft surface and said upper section of said drive shaft surface correspond to the pair of said oppositely disposed surfaces of said inner through opening of said disk hub.

9. The blade assembly for a food processor of claim 8, wherein said surface of said lower section and said drive shaft surface is the exterior surface of an adaptor positioned on said drive shaft surface.

10. The blade assembly for a food processor of claim 8, wherein said surface of said lower section and said surface of said upper section have the same general shape with said upper section capable of being positioned such that the similarly shaped surfaces on said upper section are not positioned above similarly shaped surfaces on said lower section.

* * * * *